Feb. 12, 1935.　　　R. M. HARTIGAN　　　1,991,248
FURNACE CONTROL APPARATUS
Filed March 15, 1934
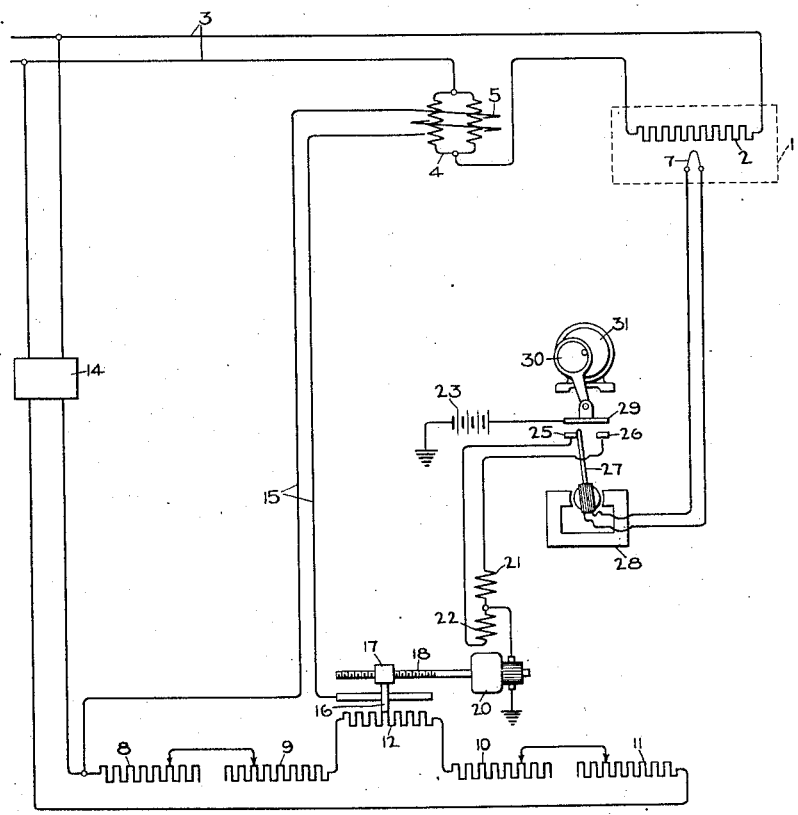
Inventor:
Richard M. Hartigan,
by Harry E. Dunham
His Attorney.

Patented Feb. 12, 1935

1,991,248

UNITED STATES PATENT OFFICE 1,991,248

FURNACE CONTROL APPARATUS

Richard M. Hartigan, Fort Wayne, Ind., assignor to General Electric Company, a corporation of New York Application March 15, 1934, Serial No. 715,634

3 Claims. (Cl. 219—20)

My invention relates to apparatus for controlling the temperature of furnaces, particularly that of electric furnaces. Such furnaces as heretofore commonly constructed have employed heating units and temperature responsive control apparatus therefor by which the heating units would be energized when the furnace temperature fell below a predetermined value and deenergized when the temperature rose above another predetermined value. The heating units were of such capacity that the furnace temperature could be brought up to the desired value from a cold condition in a reasonably short time. Hence the heating elements and certain parts of the furnace and the material being heated in the furnace were subjected to changes which extended over a relatively wide range even though the indicated temperature was fairly uniform.

One object of my present invention is to provide an improved furnace control apparatus by which wide temperature changes of the parts mentioned above may be avoided. Another object of my invention is the provision of control apparatus which will give a fine temperature control of the furnace, will have the greatest flexibility and will be inexpensive to construct and maintain.

My invention will be better understood from the following description taken in connection with the accompanying drawing, and its scope will be pointed out in the appended claims.

Referring to the drawing, which is a circuit diagram of one form of apparatus embodying my invention, I have represented an electric furnace by the dotted line rectangle 1 in which are one or more heating elements represented by the resistor 2 which is connected to a suitable source of alternating current supply represented at 3. The current supplied to the heating element is controlled by the saturable core reactor 4 which is provided with the saturating winding 5. Associated with or arranged within the furnace is the temperature responsive device 7, such for example as a thermocouple and by the apparatus which I shall now describe this device controls the energization of the heating element 2 of the furnace.

A potentiometer comprising resistors 8, 9, 10, and 11 and the rheostat 12 are connected to be supplied from the source 3 through the rectifier 14. While these resistors may be fixed in value I prefer to make them adjustable, as shown, in order that the temperature of the furnace may be varied manually to suit different work conditions. The saturating or control winding 5 of the reactor connects through the leads 15 with the resistor 8 and the arm 16 of rheostat 12, which arm is carried by the nut 17 on the screw 18. This screw is represented as being direct connected with the reversible motor 20 which has the reversely wound field windings 21 and 22. Motor 20 may be energized from any suitable source but for convenience I have represented it as connected to be driven from a battery 23.

The two field windings 21 and 22 connect respectively with the fixed contacts 25 and 26, which contacts are arranged to be engaged by the moving contact 27 of the galvanometer 28 which is connected to be energized from the thermocouple 7. The circuit between the battery 23 and the motor is completed by the movable contact 29 engaging the galvanometer contact 27, contact 29 being reciprocated by the eccentric 30 on the shaft of motor 31 in order to close the circuit of motor 20 intermittently. Such an intermittent contact arrangement is disclosed in the Otis Patent No. 1,506,443, August 26, 1924, and hence need not be described in detail herein.

With the above-described apparatus if the temperature of the furnace drops below the predetermined value, the voltage supplied by the thermocouple to the galvanometer causes the latter to contact with say, contact 25, and at each downward movement of contact 29 the circuit is closed through the motor 20 and the field winding 22. The motor thereby is caused to rotate in a direction which will cause the rheostat 12 to decrease the amount of resistance in circuit with the saturating winding 5 whereby the degree of saturation of reactor 4 is increased and the reactor accordingly passes more current to the heating element. Likewise if the furnace becomes too hot the galvanometer contact 27 will touch contact 26 whereby since the current is supplied to the motor 20 through the other field winding 21 it will rotate in the opposite direction, and by causing the rheostat 12 to reduce the current flow in saturating winding will cause less current to be supplied to the heating element 2.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:

1. Furnace control apparatus comprising an electric heating element for the furnace, a saturable core reactor connected in circuit with said element and having a saturating winding, a temperature responsive device associated with the furnace, a rheostat in circuit with said winding and a reversible motor controlled by said device for varying said rheostat.

2. Furnace control apparatus comprising an electric heating element for the furnace, a saturable core reactor connected in circuit with said element and having a saturating winding, a temperature responsive device associated with the furnace, a rheostat in circuit with said winding, a reversible motor arranged to vary said rheostat and means for intermittently actuating said motor in response to said device.

3. Furnace control apparatus comprising an electric heating element therefor connected to be supplied from a source of alternating current, a saturable core reactor arranged in series with said element and provided with a saturating winding, means including a rectifier and a rheostat for connecting said winding with said source, a temperature responsive device in said furnace, a reversible motor connected to operate said rheostat, and intermittent contact apparatus for causing said motor to turn in one direction or the other in response to the operation of said temperature device.

RICHARD M. HARTIGAN.